US010808152B2

(12) United States Patent
Hoshi et al.

(10) Patent No.: US 10,808,152 B2
(45) Date of Patent: Oct. 20, 2020

(54) ADHESIVE COMPOSITION AND ADHESIVE SHEET USING SAME

(71) Applicant: DAI NIPPON PRINTING CO., LTD., Tokyo-to (JP)

(72) Inventors: Kentaro Hoshi, Tokyo-to (JP); Kazuki Tsukiyama, Tokyo-to (JP); Masafumi Tanaka, Tokyo-to (JP); Masaaki Nishi, Wako (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/531,564

(22) PCT Filed: Nov. 27, 2015

(86) PCT No.: PCT/JP2015/083487
§ 371 (c)(1),
(2) Date: Jul. 11, 2017

(87) PCT Pub. No.: WO2016/084960
PCT Pub. Date: Jun. 2, 2016

(65) Prior Publication Data
US 2017/0327719 A1 Nov. 16, 2017

(30) Foreign Application Priority Data

Nov. 28, 2014 (JP) .................. 2014-242550

(51) Int. Cl.
*C09J 163/00* (2006.01)
*C09J 133/04* (2006.01)
*C09J 11/06* (2006.01)
*C09J 109/00* (2006.01)
*C09J 7/20* (2018.01)
*C09J 7/40* (2018.01)
*C08G 59/50* (2006.01)
*C08F 279/02* (2006.01)

(52) U.S. Cl.
CPC ........... *C09J 163/00* (2013.01); *C08F 279/02* (2013.01); *C08G 59/50* (2013.01); *C09J 7/20* (2018.01); *C09J 7/40* (2018.01); *C09J 11/06* (2013.01); *C09J 109/00* (2013.01); *C09J 133/04* (2013.01); *C09J 2433/00* (2013.01); *C09J 2463/00* (2013.01)

(58) Field of Classification Search
None
See application file for complete search history.

(56) References Cited

U.S. PATENT DOCUMENTS

| 4,338,133 | A | * | 7/1982 | Toyoda | .................. C09D 11/36 106/31.58 |
| 4,778,851 | A | * | 10/1988 | Henton | .................. C08F 279/02 525/119 |
| 6,228,474 | B1 | * | 5/2001 | Kishi | .................... B29B 15/122 428/297.4 |
| 2007/0129509 | A1 | * | 6/2007 | Li | .......................... C08G 18/10 525/526 |
| 2007/0251419 | A1 | * | 11/2007 | Yamaguchi | ........... C08F 279/02 106/287.13 |
| 2008/0051524 | A1 | * | 2/2008 | Ji | ............................ C08L 63/00 525/476 |
| 2009/0234071 | A1 | * | 9/2009 | Martz | .................... C08G 77/46 525/100 |
| 2009/0308534 | A1 | | 12/2009 | Malone | |
| 2011/0024039 | A1 | * | 2/2011 | Campbell | .......... C08G 59/5086 156/330 |
| 2011/0039108 | A1 | | 2/2011 | Goeb et al. | |
| 2011/0126980 | A1 | * | 6/2011 | Campbell | .............. C09J 163/00 156/330 |
| 2013/0281573 | A1 | * | 10/2013 | Goto | .......................... C08J 5/24 523/436 |
| 2017/0327719 | A1 | * | 11/2017 | Hoshi | ...................... C09J 11/06 |

FOREIGN PATENT DOCUMENTS

| CN | 101006135 A | 7/2007 | |
| CN | 101287794 A | 10/2008 | |
| CN | 101578346 A | 11/2009 | |
| CN | 102057010 A | 5/2011 | |
| CN | 102159615 A | 8/2011 | |
| JP | 2003-082034 A | 3/2003 | |
| JP | 2004-018803 A | 1/2004 | |
| JP | 2009-506169 A | 2/2009 | |
| JP | 2010-084083 A | 4/2010 | |
| JP | 2011-202043 A | 10/2011 | |
| JP | 2011-529118 A | 12/2011 | |
| WO | 2006/019041 A1 | 2/2006 | |
| WO | 2007/025007 A1 | 3/2007 | |
| WO | 2010/011710 A2 | 1/2010 | |
| WO | WO-2012102201 A1 | * 8/2012 | ................ C08J 5/24 |

OTHER PUBLICATIONS

Kentaro Hoshi et al., "Adhesive Sheet", English translation of JP 2011-202043A, published Oct. 13, 2011 (Year: 2011).*

(Continued)

*Primary Examiner* — Anish P Desai
(74) *Attorney, Agent, or Firm* — Oliff PLC

(57) ABSTRACT

The present invention aims to provide an adhesive composition which enables achievement of highly strong adhesion between a lightweight composite resin and a lightweight metal member, and which can maintain excellent adhesive strength even in cases where the ambient temperature largely changes or the adhesive composition is in contact with water or a snow-melting agent, and an adhesive sheet using it. The above object can be achieved with an adhesive composition containing at least an epoxy resin, an acrylic particle, and a curing agent, wherein the acrylic particle is a core-shell structure containing a butadiene-based rubber, and polymethacrylate or polyacrylate. The adhesive sheet is constituted such that an adhesive layer formed with the adhesive composition is present between a first release film and a second release film.

19 Claims, 6 Drawing Sheets

(56) References Cited

OTHER PUBLICATIONS

Hoshi Kentaro et al., "Adhesive Composition and Adhesive Sheet Using The Same", machine translation of JP2013-006974 A, published on Jan. 10, 2013. (Year: 2013).*
May 30, 2017 International Preliminary Report on Patentability issued in International Patent Application No. PCT/JP2015/083487.
Oct. 14, 2016 Office Action issued in Japanese Patent Application No. 2015-232286.
Mar. 1, 2016 International Search Report issued in International Patent Application No. PCT/JP2015/083487.
May 23, 2018 Extended European Search Report issued in European Patent Application No. EP 15863067.3.
Aug. 5, 2019 Office Action issued in Chinese Patent Application No. 201580063762.9.

* cited by examiner

ADHESIVE COMPOSITION AND ADHESIVE SHEET USING SAME

TECHNICAL FIELD

The present invention relates to an adhesive composition, more specifically, to an adhesive composition which enables achievement of highly strong adhesion between a lightweight metal and a lightweight composite resin constituting a composite member of a vehicle body, and which can maintain excellent adhesive strength even in cases where the ambient temperature largely changes or the adhesive composition is in contact with water or a snow-melting agent, and an adhesive sheet using it.

BACKGROUND ART

In the automobile industry, in order to provide solutions for prevention of global warming by reduction of emissions of carbon dioxide $CO_2$ and the like, weight saving of the vehicle body has advanced, and hybrid vehicles and electric vehicles are becoming popular. Accordingly, as materials to be used for vehicle bodies, lightweight metals such as aluminum and magnesium, and lightweight composite resins such as FRP (CFRP: Carbon Fiber Reinforced Plastics; GFRP: Glass Fiber Reinforced Plastics) are becoming more likely to be used. Since bonding of a lightweight metal such as aluminum with a lightweight composite resin such as FRP cannot be easily achieved by use of commonly used engagement or welding, an adhesion method using an adhesive is carried out therefor.

A strength property upon adhesion and a strength retaining property over time are required for an adhesive. In particular, when an adhesive is used for vehicle bodies, it is exposed to vibration, impact, changes in the ambient temperature, wind and rain, and/or the like. The adhesive is therefore required to achieve adhesion with higher strength at the time of adhesion, as well as maintenance of higher strength over time.

As an adhesive, a thermoplastic resin such as an epoxy resin is commonly used. An epoxy resin is said to have high mechanical strength after curing of the resin itself, but to have rather insufficient toughness. In order to solve such a problem, Patent Document 1 attempted to give flexibility to an epoxy adhesive by addition of a thermoplastic resin or the like to an epoxy resin.

PRIOR ART DOCUMENT

Patent Document

[Patent Document 1] JP 2003-82034 A

SUMMARY OF THE INVENTION

Problems to be Solved by the Invention

However, since the thermoplastic resin is added to the epoxy adhesive in the adhesive proposed in Patent Document 1, heat resistance and water resistance of the adhesive need to be increased. This is especially highly demanded for vehicle members that may be exposed to large changes in the ambient temperature and that may be in contact with water or a snow-melting agent, wherein the adhesive is required to maintain sufficient adhesive strength.

The present invention was made to meet the above requirement, and aims to provide an adhesive composition that can maintain excellent adhesive strength, and an adhesive sheet using it.

Means for Solving the Problems

The adhesive composition for solving the above problem according to the present invention comprises at least an epoxy resin, an acrylic particle, and a curing agent, wherein the acrylic particle is a core-shell structure containing a butadiene-based rubber, and polymethacrylate or polyacrylate.

The adhesive composition according to the present invention may be constituted such that the epoxy resin is a bisphenol A-type epoxy resin.

The adhesive composition according to the present invention may be constituted such that the acrylic particle has an average particle size of not more than 200 nm.

The adhesive composition according to the present invention may be constituted such that the blending ratio of the acrylic particle is 3% to 33% by mass with respect to a total mass of the adhesive composition of 100%.

The adhesive composition according to the present invention may be constituted such that the acrylic particle has a reactive functional group.

The adhesive composition according to the present invention may be constituted such that the reactive functional group is an epoxy group.

The adhesive composition according to the present invention may be constituted such that the butadiene-based rubber, and polymethacrylate or polyacrylate in the acrylic particle are epoxy-modified polymethacrylate or epoxy-modified polyacrylate.

The adhesive sheet for solving the above problem according to the present invention comprises an adhesive layer between a first release film and a second release film, the adhesive layer containing at least an epoxy resin, an acrylic particle, and a curing agent, wherein the acrylic particle is a core-shell structure containing a butadiene-based rubber, and polymethacrylate or polyacrylate.

The adhesive sheet according to the present invention may be constituted such that the epoxy resin is a bisphenol A-type epoxy resin.

The adhesive sheet according to the present invention may be constituted such that the acrylic particle has an average particle size of not more than 200 nm.

The adhesive sheet according to the present invention may be constituted such that the blending ratio of the acrylic particle is 3% to 33% by mass with respect to a total mass of the adhesive composition of 100%.

The adhesive sheet according to the present invention may be constituted such that the acrylic particle has a reactive functional group.

The adhesive sheet according to the present invention may be constituted such that the reactive functional group is an epoxy group.

The adhesive sheet according to the present invention may be constituted such that the butadiene-based rubber, and polymethacrylate or polyacrylate in the acrylic particle are epoxy-modified polymethacrylate or epoxy-modified polyacrylate.

Effect of the Invention

According to the present invention, an adhesive composition that can maintain excellent adhesive strength, and an adhesive sheet using it can be provided.

DETAILED DESCRIPTION OF THE INVENTION

Figure 1:
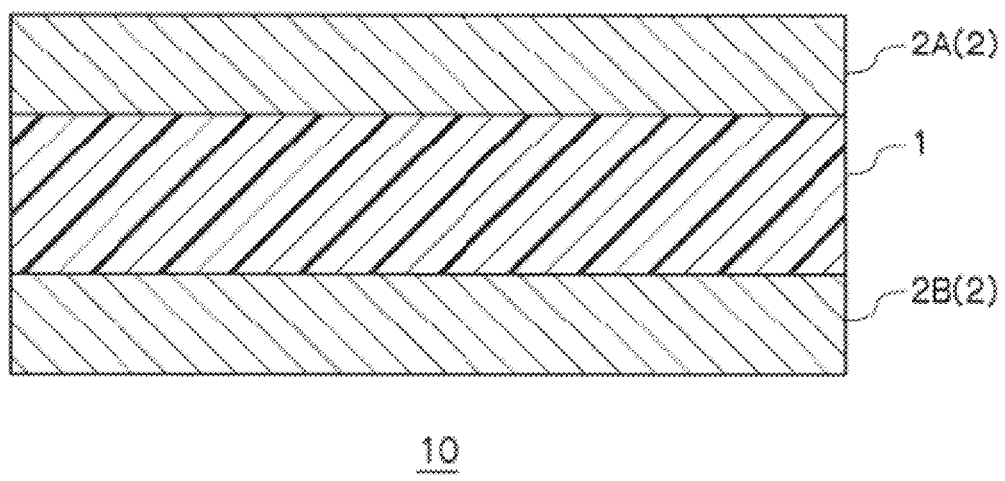
FIG. 1 shows a cross-sectional schematic diagram illustrating an example of the adhesive sheet by the present invention.

The adhesive composition and the adhesive sheet according to the present invention are described below in detail. The scope of the present invention is not limited to the following embodiments as long as the scope of the gist of the invention is included.

[Adhesive Composition]

The adhesive composition according to the present invention is an adhesive composition capable of forming an adhesive layer. The adhesive composition comprises at least an epoxy resin, an acrylic particle, and a curing agent, wherein the acrylic particle is a core-shell structure containing a butadiene-based rubber, and polymethacrylate or polyacrylate.

Since a particular acrylic particle is contained in the epoxy resin, the adhesive composition can maintain excellent adhesive strength by the action of the acrylic particle. The adhesive composition enables achievement of highly strong adhesion between a lightweight composite resin and a lightweight metal member, and can maintain excellent adhesive strength even in cases where the ambient temperature largely changes or the adhesive composition is in contact with water or a snow-melting agent. For example, in cases where the adhesive composition is used in a vehicle body, the adhesion site may be exposed to severe factors such as vibration, impact, changes in the ambient temperature, wind and rain, and/or contact with water or a snow-melting agent. The adhesive composition is excellent because higher adhesive strength can be achieved upon adhesion between, for example, FRP and aluminum, and higher strength can be maintained over time.

Each component constituting the adhesive composition is described below.

(Epoxy Resin)

The epoxy resin contained in the adhesive composition of the present invention is a prepolymer having at least one epoxy group or glycidyl group. When used in combination with a curing agent, the epoxy resin is cured by cross-linking polymerization reaction, and the adhesive composition after the curing can have increased heat resistance. Examples of the epoxy resin include aromatic or alicyclic epoxy resins, for example, bisphenol-type epoxy resins such as bisphenol A-type epoxy resins and bisphenol F-type epoxy resins; novolak-type epoxy resins such as novolak epoxy resins and cresol novolak epoxy resins; and epoxy resins such as biphenyl-type epoxy resins, stilbene-type epoxy resins, triphenol methane-type epoxy resins, alkyl-modified triphenol methane-type epoxy resins, triazine nucleus-containing epoxy resins, and dicyclopentadiene-modified phenol-type epoxy resins; and aliphatic epoxy resins; as well as novolak type phenol resins such as phenol novolak resins, cresol novolak resins, and bisphenol A novolak resins; phenol resins such as resol phenol resins; urea resins; triazine ring-containing resins such as melamine resins; unsaturated polyester resins; bismaleimide resins; polyurethane resins; diallyl phthalate resins; silicone resins; resins having a benzoxazine ring; and cyanate ester resins. Among these epoxy-based resins, bisphenol A-type epoxy resins, which are rigid bifunctional epoxy resins having a bisphenol skeleton, are preferably used. Bisphenol A-type epoxy resins can be divided, based on the number of repeat units in the bisphenol skeleton, into bisphenol A-type epoxy resins with a backbone having 0 to 1 unit, which are liquids at normal temperature, and bisphenol A-type epoxy resins with a backbone having 2 to 10 units, which are solids at normal temperature. In the present invention, a bisphenol A-type epoxy resin which is a solid at normal temperature is preferably used.

A bisphenol A-type epoxy resin which is a solid at normal temperature rapidly melts at a temperature of not less than the melting point to become in a low-viscosity liquid state. Thus, in the process of bonding of an adherend, close contact of the adhesive to the adherend can be achieved by heating, and subsequent curing of the adhesive allows tight adhesion between the adhesive and the adherend, so that the adhesive strength can be increased. Such a bisphenol A-type epoxy resin has a high crosslink density, and therefore has high mechanical strength, high chemical resistance, high curability, and low hygroscopicity (due to a small free volume). As a result, the bonding strength between adherends can be increased. As long as the effect of the present invention is not inhibited, the resin may contain a bisphenol A-type epoxy resin which is a liquid at normal temperature.

The bisphenol A-type epoxy resin preferably has a glass transition temperature within the range of 50° C. to 150° C. from the viewpoint of mechanical strength, heat resistance, and film-forming property. Specific examples of the bisphenol A-type epoxy resin having a backbone with 2 to 10 units which is a solid at normal temperature include JER1001, manufactured by Japan Epoxy Resin Co., Ltd.

The epoxy resin may include a tri- or higher-functional epoxy resin in addition to the bisphenol A-type epoxy resin. Examples of the tri- or higher-functional epoxy resin include epoxy resins having a tris(hydroxyphenyl)methane structure, epoxy resins having a tetrakis(hydroxyphenyl)ethane structure, epoxy resins having an aminophenol structure, and epoxy resins having a bis(aminophenyl)methane structure. Among these, epoxy resins having a bis(aminophenyl)methane structure are preferred. Examples of such resins include N,N,N',N'-tetraglycidyldiaminodiphenylmethane. Examples of the epoxy group include a glycidyl amine group and a glycidyl ether group. From the viewpoint of shelf stability of the adhesive composition, the epoxy resin preferably has not less than three glycidyl ether groups. By inclusion of such a tri- or higher-functional epoxy resin, formation of a cross-linked structure by the epoxy resin occurs, resulting in an increased heat resistance of the adhesive in a high-temperature solution. Further, by the cross-linking, self-assembly occurs using the epoxy resin as a matrix, resulting in local formation of sea-island structures. It is though that such sea-island structures give the toughness to the cured adhesive. Such a tri- or higher-functional epoxy resin may be included as long as the effect of the present invention is not inhibited. In cases where a tri- or higher-functional epoxy resin is included, the content is 5 to 50% by mass with respect to the total mass of the adhesive composition.

The tri- or higher-functional epoxy resin may be a commercially available resin such as jER1032H60 (epoxy resin having a tris(hydroxyphenyl)methane structure), manufactured by Mitsubishi Chemical Corporation; jER1031S (epoxy resin having a tetrakis(hydroxyphenyl)ethane structure), manufactured by Mitsubishi Chemical Corporation; EHPE3150 (epoxy resin having a oxiranyl cyclohexane structure), manufactured by Daicel; jER630 (epoxy resin having an aminophenol structure), manufactured by Mitsubishi Chemical Corporation; and jER604 (epoxy resin having a diaminodiphenylmethane structure), manufactured by Mitsubishi Chemical Corporation. The tri- or higher-functional epoxy resins described above may be used individually, or two or more of these may be used in an appropriate combination.

The content of the epoxy resin, including the bisphenol A-type epoxy resin, and the bisphenol A-type epoxy resin which is in a liquid state at normal temperature and the tri- or higher-functional epoxy resin which may be included when necessary, and the like, is preferably within the range of 40 parts by mass to 90 parts by mass with respect to the total amount of the resin components in the adhesive composition.

(Epoxy-Modified Silicone Resin)

An epoxy-modified silicone resin may be included in the adhesive composition, if necessary. By the inclusion of the epoxy-modified silicone resin, both heat resistance and flexibility (toughness) can be achieved. The epoxy-modified silicone resin means a silicone resin containing an epoxy group or an epoxy compound introduced as a part thereof. The silicone resin is a compound having a polyorganosiloxane skeleton, wherein the main skeleton (backbone) portion is usually mainly composed of repeats of an organosiloxane unit, and wherein the main skeleton has at least one silanol group. By addition reaction of the silanol group and the epoxy compound, an epoxy-modified silicone resin can be obtained. The main skeleton of the silicone resin may have a branched structure as long as it has at least one silanol group. The epoxy-modified silicone resin may also be a reaction product between an epoxy resin and a silicone resin, and may be, for example, a product obtained by reaction of an OH group(s) in the epoxy resin skeleton with silanol. The reaction product is regarded as an epoxy-modified silicone resin even in cases where the epoxy resin is contained in a larger amount and silicone is therefore apparently suspended from the epoxy resin. A single kind of epoxy-modified silicone resin, or two or more kinds of epoxy-modified silicone resins in an appropriate combination, may be used.

In addition to the epoxy-modified silicone resin described above, an epoxy-modified silane compound may be used in combination. By combined use of an epoxy-modified silicone resin and an epoxy-modified silane compound, the water resistance and the adhesive strength can be further increased. Examples of the epoxy-modified silane compound include γ-glycidoxypropyltrimethoxysilane, γ-glycidoxypropyltriethoxysilane, 2-(3,4-epoxycyclohexyl)ethyltrimethoxysilane, 2-(3,4-epoxycyclohexyl)ethyltriethoxysilane, (γ-glycidoxypropyl)(methyl)dimethoxysilane, (γ-glycidoxypropyl)(ethyl)dimethoxysilane, (γ-glycidoxypropyl)(methyl)diethoxysilane, (γ-glycidoxypropyl)(ethyl)diethoxysilane, [2-(3,4-epoxycyclohexyl)ethyl](methyl)dimethoxysilane, [2-(3,4-epoxycyclohexyl)ethyl](ethyl)dimethoxysilane, [2-(3,4-epoxycyclohexyl)ethyl](methyl)diethoxysilane, [2-(3,4-epoxycyclohexyl)ethyl](ethyl)diethoxysilane, (γ-glycidoxypropyl)(methoxy)dimethylsilane, (γ-glycidoxypropyl)(methoxy)diethylsilane, (γ-glycidoxypropyl)(ethoxy)dimethylsilane, (γ-glycidoxypropyl)(ethoxy)diethylsilane, [2-(3,4-epoxycyclohexyl)ethyl](methoxy)dimethylsilane, [2-(3,4-epoxycyclohexyl)ethyl](methoxy)diethylsilane, [2-(3,4-epoxycyclohexyl)ethyl](ethoxy)dimethylsilane, [2-(3,4-epoxycyclohexyl)ethyl](ethoxy)diethylsilane, and partial condensates thereof. These epoxy-modified compounds may be used individually, or as an appropriate combination of two or more thereof. Commercially available products may also be used, and examples of such products include ES1001N, ES1002T, and ES1023 (these are manufactured by Shin-Etsu Chemical Co., Ltd.); and methyl silicate MSEP2 (manufactured by Mitsubishi Chemical Corporation).

In cases where an epoxy-modified silicone resin is included, its content is preferably within the range of 5 parts by mass to 40 parts by mass with respect to the total amount of the resin components (that is, the epoxy resin, the epoxy-modified silicone resin, and the acrylic particle) in the adhesive composition.

(Acrylic Resin)

An acrylic resin is contained in the adhesive composition when necessary. It is preferably contained. As the acrylic resin, a binary copolymer of methyl methacrylate-butyl acrylate-methyl methacrylate (including polymethyl methacrylate-polybutyl acrylate-polymethyl methacrylate) or its modified product is used. By adding such a binary block copolymer composed of a methacrylate polymer block (which may be hereinafter referred to as MMA for short) and an butyl acrylate polymer block (which may be hereinafter referred to as BA for short) to the epoxy resin containing the bisphenol A-type epoxy resin and the tri- or higher-functional epoxy resin, an adhesive layer which has toughness, which can maintain excellent adhesive strength in use environments for vehicle bodies, and which has an excellent adhesive strength retaining property can be realized. When the term "epoxy resin" is simply used hereinafter, it means either a case where the epoxy resin is a bisphenol A-type epoxy resin, or a case where the epoxy resin contains both a bisphenol A-type epoxy resin and a tri- or higher-functional epoxy resin.

The above effect is assumed to be exhibited as follows. In the binary copolymer of MMA-BA-MMA, the MMA portion acts as a "hard" segment, and the BA portion acts as a "soft" segment. In a conventional adhesive, an acrylic resin is added for giving toughness (flexibility) to an epoxy resin. However, by the addition of the acrylic resin, heat resistance of the adhesive itself is decreased. In cases of an acrylic resin having both a "hard" segment and a "soft" segment as described above, it is thought that, since the "hard" segment portion contributes to heat resistance, and the "soft" segment portion contributes to toughness or flexibility, an adhesive layer which has toughness, and which can maintain excellent adhesive strength in use environments for vehicle bodies can be realized.

The binary copolymer of MMA-BA-MMA may be a modified product containing a functional group such as carboxylic acid, hydroxyl group, or amide group introduced to part of the BA block or the MMA block. By use of such a modified product, higher heat resistance can be achieved, and compatibility with the epoxy resin can be increased, so that the adhesive strength can be increased.

When the MMA-BA-MMA binary copolymer is added to the epoxy resin, self-assembly occurs using the epoxy resin as a matrix since the MMA block portion is compatible with the epoxy resin while the BA block portion is not compatible with the epoxy resin. As a result, in the stage before the curing of the resin, a sea-island structure in which the epoxy resin corresponds to the sea, and the acrylic resin corresponds to the island is formed. In cases where the functional group(s) is/are introduced in the MMA-BA-MMA binary copolymer, compatibility between the epoxy resin and the acrylic resin increases, so that the island portion becomes smaller, and hence the resins become apparently compatible with each other. Because of formation of such a sea-island structure and the apparent compatible state, interfacial failure can be avoided, and excellent adhesive strength can be maintained in use environments for vehicle bodies. On the other hand, when the compatibility with the epoxy resin is decreased by decreasing the polarity of the acrylic resin by, for example, use of an unmodified acrylic resin having no functional group introduced, a sea-island structure in which the epoxy resin corresponds to the island, and the acrylic resin corresponds to the sea is formed, in contrast to the above case. This is thought to be the reason why an adhesive layer which can retain excellent adhesive strength in use environments for vehicle bodies while maintaining a certain degree of adhesion strength can be realized. In cases where such a sea-island structure is present, invasion of water from the interface between the adhesive (resin) and the adherend can be suppressed, so that an adhesive layer having an even better adhesive strength retaining property can be realized.

For the formation of the sea-island structure, it is preferred to blend the epoxy resin and the acrylic resin (MMA-BA-MMA binary copolymer) at a ratio of 100:4 to 100:100 on a mass basis. Blending of these resins at this ratio allows dispersion of nano-sized microparticles of the acrylic resin (islands) in the epoxy resin (sea) in the stage before the curing of the resin, resulting in achievement of the apparent compatible state. By curing of the resin while maintaining the apparent compatible state, excellent adhesive strength can be maintained.

(Acrylic Particle)

The acrylic particle has a core-shell structure containing a butadiene-based rubber, and polymethacrylate or polyacrylate. Usually, in cases where particles with only a butadiene-based rubber are added to the epoxy resin, the particles with only the butadiene-based rubber may be aggregated in the adhesive composition or the adhesive layer. In contrast, in acrylic microparticles having a core-shell structure of the present invention, the butadiene-based rubber is coated with the polymethacrylate or polyacrylate, so that aggregation hardly occurs when the particles are added to the epoxy resin. The butadiene-based rubber in the core portions of the acrylic particles can be dispersed in a particle state while allowing construction of a network of the acrylic particles in the adhesive composition or the adhesive layer, so that toughness can be given to the resulting adhesive layer.

For further improvement of dispersibility of the acrylic particles, the acrylic particles preferably have a reactive functional group. From the viewpoint of improving compatibility with the epoxy resin, the reactive functional group is preferably an epoxy group. The reactive functional group such as an epoxy group is preferably contained in the polymethacrylate or polyacrylate in the shell portion. Alternatively, the polymethacrylate or the polyacrylate in the shell portion may be preliminarily prepared as an epoxy-modified polymethacrylate or an epoxy-modified polyacrylate. The epoxy-modified polymethacrylate or the epoxy-modified polyacrylate is not limited as long as the polymethacrylate or the polyacrylate contains an epoxy group introduced therein. For example, it may be prepared by introducing an epoxy group by reaction with an acrylic chain of glycidyl methacrylate.

The acrylic particle preferably has an average particle size of not more than 200 nm. For example, in cases of acrylic microparticles with a micron-scale average particle size, Tg of the acrylic portion constituting each microparticle is remarkable, so that an apparent decrease in Tg occurs. On the other hand, in cases of acrylic microparticles with an average particle size of not more than 200 nm, the acrylic microparticles dispersed in the adhesive composition behave as if they were compatible, so that Tg of the acrylic portion is hidden. Thus, there is no decrease in Tg as a whole, and local formation of networks of acrylic microparticles rather occurs, resulting in an increase in Tg. In particular, in cases where a reactive functional group such as an epoxy group is introduced in the acrylic particle, the Tg-increasing effect is remarkable. The increase in Tg largely influences water resistance. By keeping the high Tg, the water resistance can be maintained. The lower limit of the average particle size of the acrylic microparticle is not limited. The average particle size is preferably not less than 10 nm from the viewpoint of availability, toughness-giving effect, reaggregation ability, and the like.

The acrylic particles are preferably contained such that the mass ratio of the acrylic particles is 3% to 33% with respect to a total mass of the adhesive composition of 100%. The ratio between the content of the acrylic particles M1 and the content of the epoxy resin (including the bisphenol A-type epoxy resin and, if necessary, the tri- or higher-functional epoxy resin) M2 (M1/M2) is preferably 0.05 to 0.35.

Blending of the epoxy resin and the acrylic particles allows dispersion of nano-sized microparticles of the acrylic particles (islands) in the epoxy resin (sea) in the stage before the curing of the resin, resulting in achievement of the apparent compatible state. By curing of the resin while maintaining the apparent compatible state, excellent adhesive strength can be maintained. When the acrylic particles are included, the acrylic particles are likely to be localized such that the particles are microdispersed in the island structures of the sea-island. The special sea-island structure in which the acrylic particles are microdispersed in the island portions of the sea-island structure can enhance water resistance of the resulting adhesive layer, and allows achievement of higher adhesive strength upon adhesion as well as maintenance of higher strength over time even in cases where, in particular, the adhesive composition is exposed to severe factors such as vibration, impact, changes in the ambient temperature, wind and rain, and/or contact with water or a snow-melting agent as in cases of, for example, use in a vehicle body.

(Curing Agent)

Reaction of the epoxy resin, the acrylic resin, and the curing agent (including a curing catalyst) proceeds by heating or the like to cause curing of the adhesive composition. In the present invention, for promotion of the curing reaction, the curing agent is contained in the adhesive composition. Examples of the curing agent include amine-based curing agents such as aliphatic polyamines including diethylenetriamine (DETA), triethylenetetramine (TETA), and meta-xylylene diamine (MXDA), aromatic polyamines including diaminodiphenylmethane (DDM), m-phenylenediamine (MPDA), and diaminodiphenylsulfone (DDS), and polyamine compounds containing dicyandiamide (DICY), organic acid dihydrazide, or the like; and acid anhydride-based curing agents such as alicyclic acid anhydrides (liquid acid anhydrides) including hexahydrophthalic anhydride (HHPA) and methyltetrahydrophthalic anhydride (MTHPA), and aromatic acid anhydrides including trimellitic anhydride (TMA), pyromellitic dianhydride (PMDA), and benzophenone tetracarboxylic dianhydride (BTDA). Examples of the curing agent also include phenol-based curing agents such as phenol resins, and isocyanate-based curing agents such as blocked isocyanate. Among these, amine-based curing agents can be preferably used. Dicyandiamide-based curing agents are especially preferred.

In cases where a dicyandiamide-based curing agent is used as the curing agent, blocked isocyanate is preferably used in combination. By the combined use of dicyandiamide and blocked isocyanate, shelf stability of the adhesive can be increased. By combined use of a cyanate-based curing agent, in cases where hydroxyl groups are present on the surface of a lightweight metal such as aluminum or magnesium, which is preferably used for vehicle bodies and the like, cross-links are formed between the hydroxyl groups and the adhesive component, so that the surface adhesion property can be improved.

The blocked isocyanate is a reaction product obtained by addition reaction of a blocking agent to an isocyanate group(s) of an isocyanate compound. Thus, the blocked isocyanate is a compound inactivated by protection of an isocyanate group(s) by a blocking agent. By heat treatment of the blocked isocyanate at a predetermined temperature, dissociation of the blocking agent from the isocyanate group(s), that is, deblocking, occurs to cause regeneration of an active isocyanate group(s).

Examples of the isocyanate compound include isocyanate having two or more isocyanate groups in each molecule. Specific examples of the isocyanate compound include aliphatic isocyanates such as tetramethylene diisocyanate, hexamethylene diisocyanate, 1,3,6-hexamethylene triisocyanate, isophorone diisocyanate, and 4,4'-dicyclohexylmethane diisocyanate; aromatic isocyanates such as 4,4'-diphenylmethane diisocyanate, 2,4-tolylene diisocyanate, 2,6-tolylene diisocyanate, xylylene diisocyanate, 1,5-naphthalene diisocyanate, and 4,4-diphenyl diisocyanate; and alicyclic isocyanates such as dicycloheptane triisocyanate.

Examples of the blocking agent include active methylene-based blocking agents such as ethyl acetoacetate; phenol-based blocking agents such as phenol, cresol, and xylenol; pyrazole-based blocking agents such as dimethylpyrazole; alcohol-based blocking agents such as methanol, ethanol, diethyl malonate, methyl lactate, and ethyl lactate; oxime-based blocking agents such as methyl ethyl ketone oxime, diacetyl monoxime, and cyclohexane oxime;

mercaptan-based blocking agents such as butyl mercaptan, t-butyl mercaptan, and thiophenol; imide-based blocking agents such as succinimide; amine-based blocking agents such as aniline and butylamine; imidazole-based blocking agents such as imidazole and 2-ethylimidazole; and imine-based blocking agents such as methyleneimine and propyleneimine.

A commercially available product may be used as the blocked isocyanate. Examples of such a product include MF-K60B, SBN-70D, TPA-B80E, 17B-60PX, E402-1380B, and E402-B80T (manufactured by Asahi Kasei Corporation).

The content of the curing agent in the adhesive composition may be appropriately determined based on the amine number and the acid number of the curing agent. For example, in cases where dicyandiamide is used as the curing agent, the content of the curing agent is preferably 5 to 30 parts by mass with respect to 100 parts by mass of the epoxy resin and the epoxy-modified silicone resin. In cases where the blending ratio of the curing agent is within this range, high heat resistance can be achieved after the bonding; deterioration of the adhesive strength due to temperature changes can be suppressed; and the shelf stability (pot life) can be maintained. In cases where the shelf stability is low, the curing reaction may proceed during the storage period before bonding of the adhesive sheet to the adherend. In cases where the content of the curing agent is too much, unreacted curing agent may remain after curing of the adhesive composition, resulting in low adhesive force.

(Others)

For improvement or modification of the processability, heat resistance, weatherability, mechanical properties, dimensional stability, antioxidative properties, sliding properties, releasability, incombustibility, antifungal properties, electric properties, strength, and/or the like, the adhesive composition according to the present invention may further contain, if necessary, a lubricant, plasticizer, bulking agent, filler, antistatic agent, antiblocking agent, cross-linking agent, antioxidant, ultraviolet absorber, light stabilizer, coloring agent such as a dye or a pigment, or the like. In addition, the adhesive composition may contain a coupling agent such as a silane-based, titanium-based, or aluminum-based coupling agent, if necessary. By this, close contact between the resin and the adherend, and between the resin and the later-mentioned core goods can be enhanced.

The adhesive composition can be prepared into an adhesive by mixing the components described above and, if necessary, kneading and dispersing the resulting mixture. The mixing or dispersing method is not limited, and a normal kneader/disperser such as a 2-roll mill, 3-roll mill, pebble mill, trommel, Szegvari attritor, high-speed impeller disperser, high-speed stone mill, high-speed impact mill, Despa, high-speed mixer, ribbon blender, co-kneader, intensive mixer, tumbler, blender, disperser, homogenizer, or ultrasonic disperser may be applied. Preferably, in cases where a plurality of kinds of hard epoxy resins are used, these resins are first mixed and stirred, and then a curing agent is mixed and stirred therewith, followed by dilution of the resulting mixture with a solvent. Thereafter, a soft epoxy resin is mixed and stirred with the resulting dilution, and an acrylic resin is then mixed and stirred therewith.

[Adhesive Sheet]

The adhesive sheet 10 according to the present invention has an adhesive layer 1 between a first release film 2A and a second release film 2B as shown in FIG. 1. The adhesive layer 1 contains at least a bisphenol A-type epoxy resin, an acrylic particle, and a curing agent, wherein the acrylic particle is a core-shell structure containing a butadiene-based rubber, and polymethacrylate or polyacrylate. The adhesive layer 1 satisfies an adhesive strength retaining rate of not less than 68% after immersion in each of water at 80° C., 10% NaCl solution at 80° C., and 50% CaCl$_2$ solution at 80° C. for 200 hours following adhesion of a metal to a composite resin through the adhesive layer 1. The first release film 2A and the second release film 2B may be hereinafter collectively referred to as a release film 2.

The adhesive layer 1 may further contain a core (not shown in the figure), and may be in a mode in which the core is impregnated with the adhesive. The core is preferably a woven fabric or a non-woven fabric, and examples of the core include various conventionally known woven fabrics and non-woven fabrics. Examples of such woven fabrics and non-woven fabrics include those constituted by heat-resistant plastic fibers such as liquid crystal polymers; glass fibers; aramid fibers; carbon fibers; polyester non-woven fabrics; vinylon fibers; and urethane foams.

In cases where the adhesive layer 1 contains a core, the core may be impregnated with the adhesive composition by stacking the first release film 2A with the core and making them travel while applying the adhesive composition to the core surface using a coating machine. By drying the impregnated product and attaching the second release film 2B to the coated surface, the adhesive sheet 10 can be obtained.

Examples of the method for the application of the adhesive composition to the release film 2 include, but are not limited to, roll coating, reverse roll coating, transfer roll coating, gravure coating, gravure reverse coating, comma coating, rod coating, blade coating, bar coating, wire bar coating, die coating, lip coating, and dip coating. The adhesive composition may be applied to the release surface of the first release film 2A or to the core surface of the stack of the first release film and the core by the coating method described above, and may then be dried, followed by attaching the second release film 2B thereto. The viscosity of the adhesive composition (application liquid) is adjusted to about 1 to 20,000 centistokes (25° C.), preferably 1 to 2000 centistokes. In cases of impregnation application to the core, the viscosity is preferably low, and 1 to 1000 centistokes.

The first release film 2A and the second release film 2B may be the same or different. Preferred examples of the release film 2 include conventionally known release films, separate papers, separate films, sepa papers, release films, strippable papers, and the like. A product prepared by forming a release layer(s) on one or both sides of a release film base material such as high quality paper, coated paper, impregnated paper, or plastic film may also be used. The release layer is not limited as long as it is a releasable material, and examples of the release layer include silicone resins, organic resin-modified silicone resins, fluorine resins, amino alkyd resins, melamine-based resins, acryl-based resins, and polyester resins. Each of these resins may be of an emulsion type, solvent type, or solventless type.

The release layer is formed by applying a coating liquid containing a release layer component dispersed and/or dissolved therein, to one side of a release film base material, followed by drying under heat and/or curing. As the method of the application of the coating liquid, an arbitrary known application method such as roll coating, gravure coating, or spray coating may be used. The release layer may be formed, if necessary, on the entire area or a partial area on at least one side of the base material film.

The peel force of the first and second release films from the adhesive sheet is preferably about 1 to 2000 mN/cm, more preferably 100 to 1000 mN/cm. In case where the peel force of the release layer is less than 1 mN/cm, the peel force from the adhesive sheet or the adherend is weak, and peeling or partial floating occurs. In cases where the peel force is higher than 2000 mN/cm, the peel force of the release layer is strong, so that the release layer cannot be easily peeled off. From the viewpoint of stable releasability and processability, an addition- and/or polycondensation-type curable silicone resin for release paper containing polydimethylsiloxane as a major component is preferred.

[Method of Adhesion of Adherends]

For bonding to adherends, the first release film 2A and the second release film 2B of the adhesive sheet 10 are removed by peeling off, to expose the adhesive layer 1. The exposed adhesive layer 1 is sandwiched between a first adherend and a second adherend which may be the same or different, and the adherends are held by the adhesiveness of the adhesive layer 1. Subsequently, the first adherend and the second adherend can be strongly adhered by curing of the adhesive layer 1 under heat or under pressure and heat. Thus, the adherends can be temporarily fixed to each other utilizing the initial adhesiveness, and this can be followed by heat curing of the adhesive sheet 10 by a batch method or the like to achieve adhesion of the adherends. Therefore, the process of preheating and the like can be omitted, and productivity can be remarkably improved.

Examples of the adherend include, but are not limited to, lightweight metals such as aluminum and magnesium, and lightweight composite resins such as FRP (CFRP: Carbon Fiber Reinforced Plastics; GFRP: Glass Fiber Reinforced Plastics), to be used for vehicle bodies. The adhesive sheet is preferably used for adhesion of such lightweight metals to such lightweight composite resins. Examples of the adherend also include other metals, inorganic materials, and organic materials, as well as composite materials and laminated materials having combinations of these materials.

The heating temperature during the curing is about 60° C. to 250° C., preferably 100° C. to 180° C. The heating time is 1 to 240 minutes, preferably 10 to 120 minutes. The adhesive layer 1 of a cured adhesive sheet 10 has initial adhesiveness, and adherends can be held by only the adhesive force during the operation, without carrying out a process of preheating or the like. Thus, favorable operability as well as low cost can be achieved. Moreover, the epoxy resin gives high adhesive strength, and this adhesive strength is hardly deteriorated by temperature changes. Further, the acrylic resin makes the adhesive layer less fragile, and gives excellent shear strength, high impact resistance, and high heat resistance. Therefore, the sheet can be used for structural uses. Further, since the epoxy resin contains a particular acrylic particle, excellent adhesive strength can be maintained by the action of the acrylic particle.

[Laminated Body]

By using the adhesive sheet 10 according to the present invention, strong bonding of an FRP of a glass fiber or a carbon fiber to a lightweight metal such as aluminum or magnesium, which is difficult for conventional welding methods, can be achieved. As shown in the Examples below, the adhesive layer 1 formed with the adhesive composition according to the present invention satisfies an adhesive strength retaining rate of not less than 68% after immersion in each of water at 80° C., 10% NaCl solution at 80° C., and 50% CaCl$_2$ solution at 80° C. for 200 hours following adhesion of such a metal to such a composite resin.

A laminated body of aluminum and a metal such as iron, or a laminated body of FRPs or CFRPs can be obtained. These laminated bodies can maintain excellent adhesive strength without being affected by temperature changes, and have less fragility, excellent shear strength, high impact resistance, and high heat resistance. Therefore, they can be especially preferably applied to uses in which they are exposed to severe factors such as vibration, impact, changes in the ambient temperature, wind and rain, and/or contact with water or a snow-melting agent as in cases of, for example, use in a vehicle body. Such uses are not limited to automobiles or to the fields of airplanes, ships, and the like, and the laminated bodies may also be used in the fields of, for example, electronic devices, electronic device packages, home electrical appliances, infrastructure-related constructs, lifeline building materials, and general building materials.

EXAMPLES

The present invention is described below in more detail by way of Examples. However, the present invention is not limited to the contents of these Examples. The amount of each composition in each layer is represented by parts by mass of the solid content excluding the solvent.

Example 1

The adhesive composition of Example 1 was prepared with 65 parts by mass of a composition containing, at a ratio of 67:33 by mass, a bifunctional bisphenol A-type epoxy resin (JER1001, Mitsubishi Chemical Corporation) and acrylic particles having a core-shell structure in which the shell portion is polymethacrylate and the core portion is a butadiene-based rubber; 65 parts by mass of a tetrafunctional epoxy resin (JER604, tetraglycidyldiaminodiphenylmethane, Mitsubishi Chemical Corporation); 20 parts by mass of a silicone skeleton epoxy resin (ES1023, Shin-Etsu Chemical Co., Ltd.); 30 parts by mass of an acrylic resin (M22N, PMMA-PBA-PMMA copolymer, Arkema); 2 parts by mass of an epoxy-type silane coupling agent (KBM403, Shin-Etsu Chemical Co., Ltd.); 14 parts by mass of dicyandiamide (DICY7, Mitsubishi Chemical Corporation); and 9 parts by mass of imidazole (ajicure MYH, Ajinomoto Fine-Techno Co., Inc.).

Example 2

The adhesive composition of Example 2 was prepared with 150 parts by mass of a composition containing, at a ratio of 67:33 by mass, a bifunctional bisphenol A-type epoxy resin (JER1001, Mitsubishi Chemical Corporation) and acrylic particles having a core-shell structure in which the shell portion is polymethacrylate and the core portion is a butadiene-based rubber; 14 parts by mass of dicyandiamide (DICY7, Mitsubishi Chemical Corporation); and 9 parts by mass of imidazole (ajicure MYH, Ajinomoto Fine-Techno Co., Inc.).

Comparative Example 1

The adhesive composition of Comparative Example 1 was prepared with 200 parts by mass of a bifunctional bisphenol A-type epoxy resin (JER828, Mitsubishi Chemical Corporation); 14 parts by mass of dicyandiamide (DICY7, Mitsubishi Chemical Corporation); and 9 parts by mass of imidazole (ajicure MYH, Ajinomoto Fine-Techno Co., Inc.).

[Preparation of Adhesive Sheet]

Each of the adhesive compositions obtained in Examples 1 and 2 and Comparative Example 1 was applied to the surface of a core (polyester non-woven fabric: OL150S, manufactured by Japan Vilene Company) stacked on a release film (Sepa film: SP-PET 03BU, manufactured by Tohcello Co., Ltd.), using a comma coater such that the amount of application was 100 g/m$^2$, to allow impregnation of the core with the adhesive, thereby forming an adhesive layer. By attaching a release film (Sepa film: SP-PET 01BU, manufactured by Tohcello Co., Ltd.) onto the adhesive layer, an adhesive sheet having release sheets attached to both sides of an adhesive layer was prepared.

[Preparation of Laminated Body]

The adhesive sheet prepared was cut into a length of 25 mm and a width of 12.5 mm, and one release film was peeled off to expose the adhesive layer. The exposed adhesive layer was attached to a tip portion of aluminum (JIS standard: 6061 alloy; 100 mm length, 25 mm width, and 1.5 mm thickness). From the adhesive sheet attached to the aluminum, the other release film was peeled off to expose the adhesive layer. To the exposed adhesive layer, an uncured CFRP prepreg (TR3110 #331, manufactured by Mitsubishi Rayon Co., Ltd.) whose release films were removed was attached, and an adhesive sheet from which the release films were peeled off in the same manner as described above was further attached thereto, followed by attaching the exposed adhesive layer to a tip portion of aluminum. The final constitution was as follows: aluminum/adhesive layer/prepreg layer/adhesive layer/aluminum.

After the temporary fixation of the aluminum and the CFRP, a load of 3 kg was applied onto the temporarily fixed portion, and heating was performed at 130° C. for 2 hours to cure the adhesive layer, thereby obtaining a laminated body.

[Evaluation of Adhesive Strength]

(Initial Adhesive Strength)

Both ends of the prepared laminated body were fixed in a Tensilon universal material tester (RTF-1350, manufactured by A&D Company) in an environment at 23° C. at 50% RH, and drawn at 10 mm/minute to measure the shear strength. The measurement results are shown in Table 1.

(Adhesive Strength after Storage in High-Temperature Hot-Water Environment)

The prepared laminated body was immersed in distilled water, and left to stand in an environment at 80° C. for 200 hours. The laminated body was then removed from the distilled water, and left to stand in an environment at 23° C. at 50% RH for 24 hours. Subsequently, the shear strength was measured in the same manner as described above. The adhesive strength retaining rate after the storage in the high-temperature hot-water environment relative to the initial adhesive strength was calculated as follows: [adhesive strength after storage in high-temperature hot-water environment (MPa)]/[initial adhesive strength (MPa)]×100(%). The results are shown in Table 1.

[Evaluation of Film-Forming Properties]

To a release film (Sepa film: SP-PET 01BU, manufactured by Tohcello Co., Ltd.), an adhesive was applied using a comma coater such that the amount of application after drying was 50 g/m$^2$, and drying was carried out at 100° C. for 3 minutes, followed by observation of the external appearance of the coated surface. The evaluation standard was as follows: "a", formation of a coating having a uniform thickness (±5 μm); "x", presence of an area(s) where the adhesive was repelled and could not be applied on the surface of the release film. The results are shown in Table 1.

[Evaluation of Shelf Stability]

The prepared adhesive sheets were used. From each adhesive sheet, one release film was peeled off to expose the adhesive layer. On the adhesive layer portion after the peeling, an aluminum plate (JIS standard: 6061 alloy; 100 mm length, 25 mm width, and 1.5 mm thickness) whose surface was washed was placed. On the aluminum plate, a manual pressure bonding device (JIS Z 0237) was reciprocated once at a pressure bonding rate of about 5 mm/second, to attach the adhesive sheet to the aluminum plate, thereby obtaining a test sample. Subsequently, the obtained test sample was subjected to measurement of the peel strength (N/cm) at 180° at 300 mm/minute using a Tensilon universal tester (RTA-1T, manufactured by Orientec Co., Ltd.). In addition, each prepared adhesive sheet was left to stand in an environment at 23° C. at 50% RH for 1 month, and then a test sample was prepared in the same manner as described above, followed by measurement of the peel strength. When the test sample retained an adhesive force of not less than 50% even after being left to stand for 1 month relative to the initial adhesive force after the preparation of the test sample, the test sample was rated as "○". When the adhesive force was less than 50%, the sample was rated as "x". The results are shown in Table 1.

TABLE 1

|  |  | Example 1 | Example 2 | Comparative Example 1 |
|---|---|---|---|---|
| Adhesive strength (MPa) | Initial state | 22 | 21 | 22 |
|  | After hot water test | 22 | 14 | 11 |
|  | After CaCl$_2$ solution immersion test | 23 | 17 | 17 |
|  | After NaCl solution immersion test | 23 | 15 | 15 |
| Adhesive strength retaining property (%) | After hot water test | 100 | 68 | 50 |
|  | After CaCl$_2$ solution immersion test | 105 | 80 | 77 |
|  | After NaCl solution immersion test | 106 | 73 | 68 |
| Film-forming property | Film-forming property | ○ | x | x |
| Shelf stability | Shelf stability | ○ | ○ | ○ |

[Observation of Compatible State of Adhesive]

Figure 2:
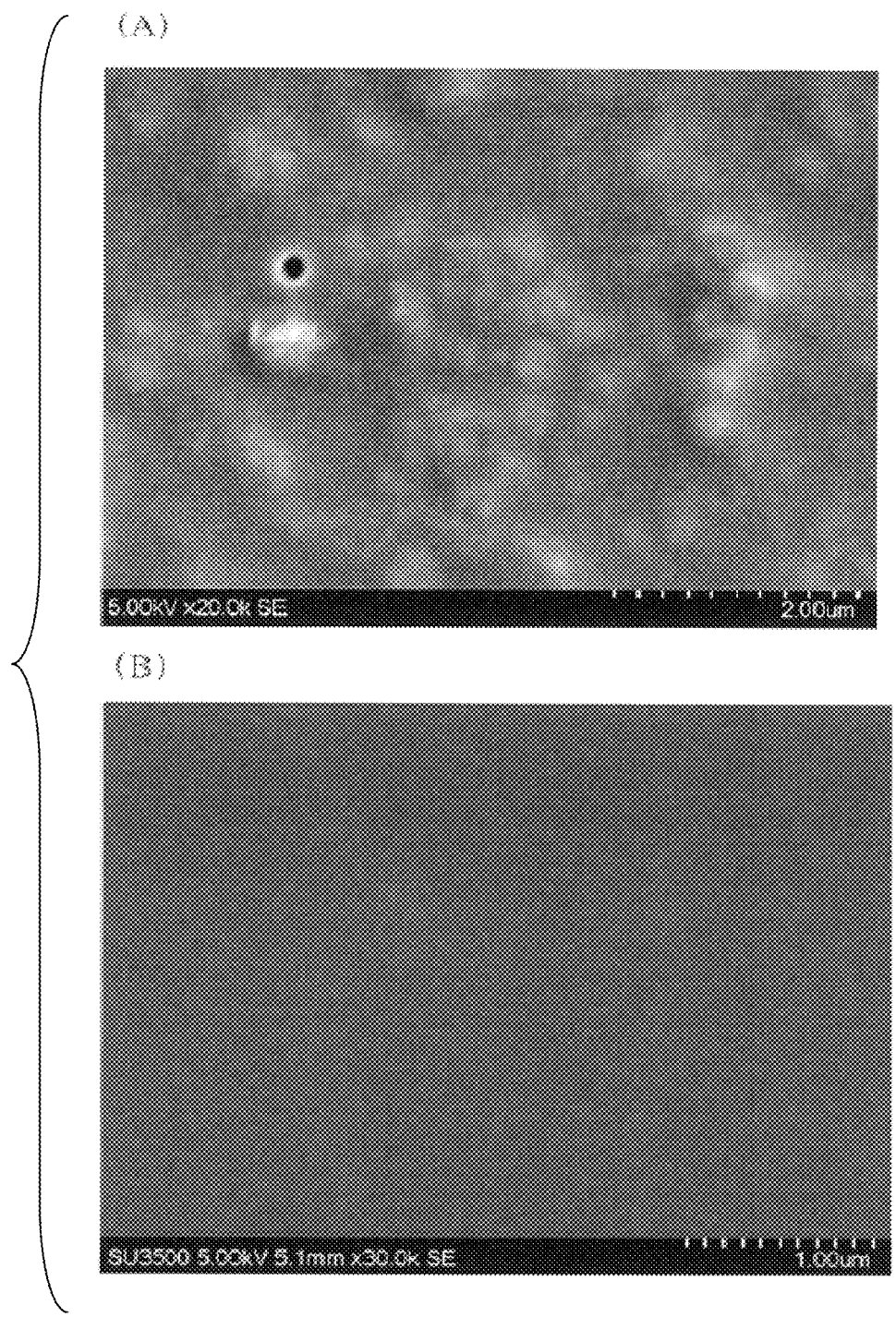
FIG. 2 shows a surface observation photograph of the adhesive layer obtained in Example 1 (A), and a surface observation photograph of the adhesive layer obtained in Comparative Example 1 (B).
Figure 3:
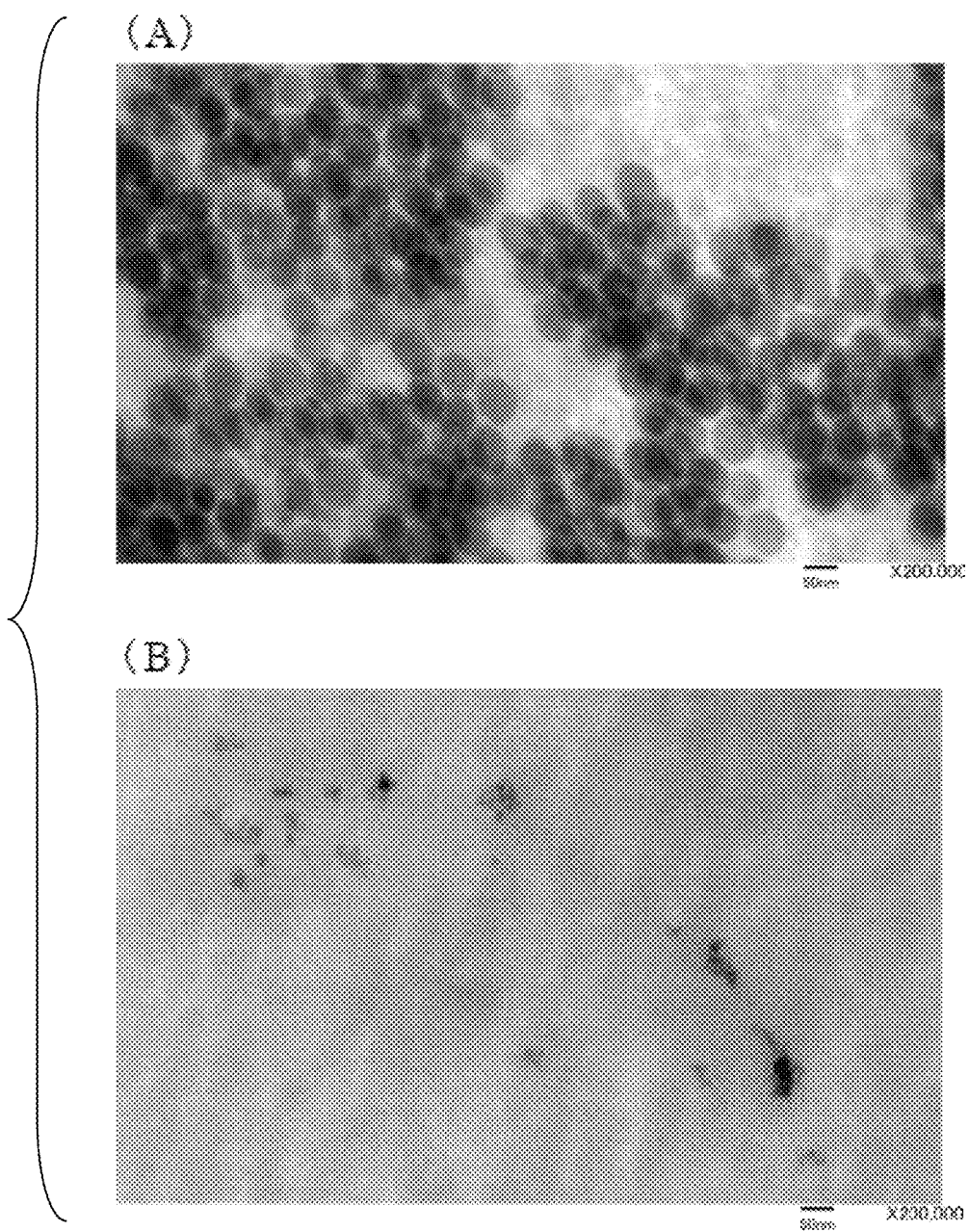
FIG. 3 shows a transmission micrograph of the adhesive layer obtained in Example 1 (A), and a transmission micrograph of the adhesive layer obtained in Comparative Example 1 (B).

Each of adhesive sheets prepared with the adhesive compositions obtained in Examples 1 and 2 and Comparative Example 1 was cured at 130° C. for 2 hours, and one release film was peeled off to expose the adhesive layer, followed by surface observation using an electron microscope (product name, SU3500; manufactured by Hitachi High-Technologies Corporation) to investigate the compatible state of the adhesive. Similarly, observation using a transmission electron microscope (TEM) was carried out. The obtained electron micrographs are shown in FIG. 2, and the obtained transmission micrographs are shown in FIG. 3. As shown in FIG. 2(A) and FIG. 3(A), the adhesive layers obtained with the adhesive compositions of Examples 1 and 2 showed formation of a sea-island structure. Nano-sized acrylic particles were found to be locally interspersed to form the sea-island structure. The sea was thought to be the epoxy resin, and the small islands were thought to be acrylic particles. It is thought that, although the acrylic resin was added in Example 1, no sea-island structure due to the acrylic resin can be seen in FIG. 2(A) and FIG. 3(A) because of an apparent compatible state.

As shown in FIG. 2(B) and FIG. 3(B), the adhesive layer obtained with the adhesive composition of Comparative Example 1 showed no formation of a sea-island structure because of uniform compatibility.

[Measurement of Dynamic Viscoelasticity]

Figure 4:
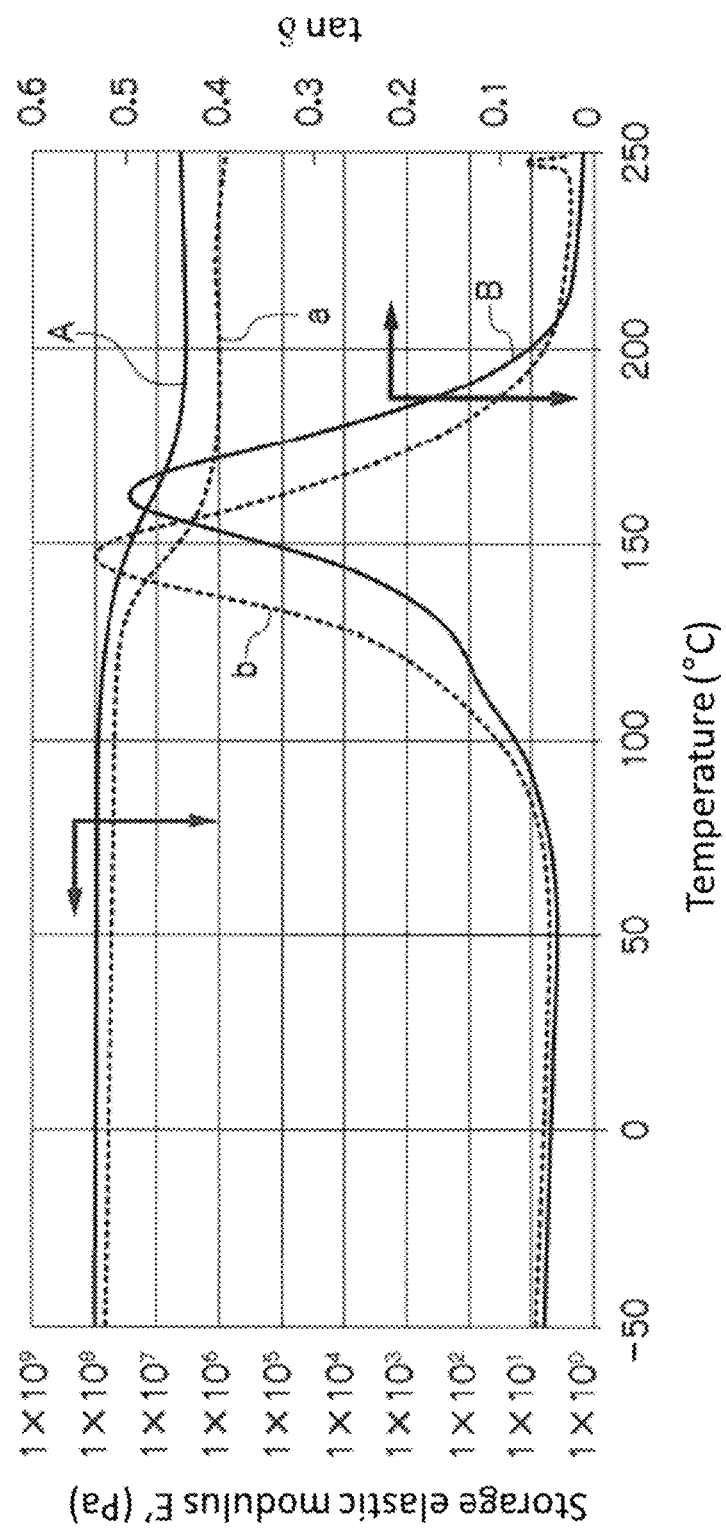
FIG. 4 shows a graph showing the temperature dependency of the storage elastic modulus (E') and the loss tangent (tan δ) of the adhesives obtained in Example 1 and Comparative Example 1.

Each of adhesive sheets prepared with the adhesive compositions obtained in Examples 1 and 2 and Comparative Example 1 was cured at 130° C. for 2 hours, and the release films on both sides were peeled off to obtain the adhesive layer. Measurement of the storage elastic modulus (E') and the loss tangent (tan δ) of this adhesive layer at 25° C. was carried out using a solid viscoelasticity analyzer (RSA-III, manufactured by TA Instruments) by a dynamic viscoelasticity measurement method according to JIS K7244-1 (attachment mode, compression mode; frequency, 1 Hz; temperature, −50° C. to 150° C.; heating rate, 5° C./minute). The results are shown in FIG. 4. As is evident from the graph showing the temperature dependency of the storage elastic modulus (E') and the loss tangent (tan δ) in FIG. 4, the adhesive layer of Example 1 had a higher softening point than the adhesive layer of Comparative Example 1. It can be seen from this result that an adhesive layer prepared with the adhesive composition obtained in Example 1 can maintain excellent adhesive strength even in a high-temperature hot-water environment.

Figure 5:
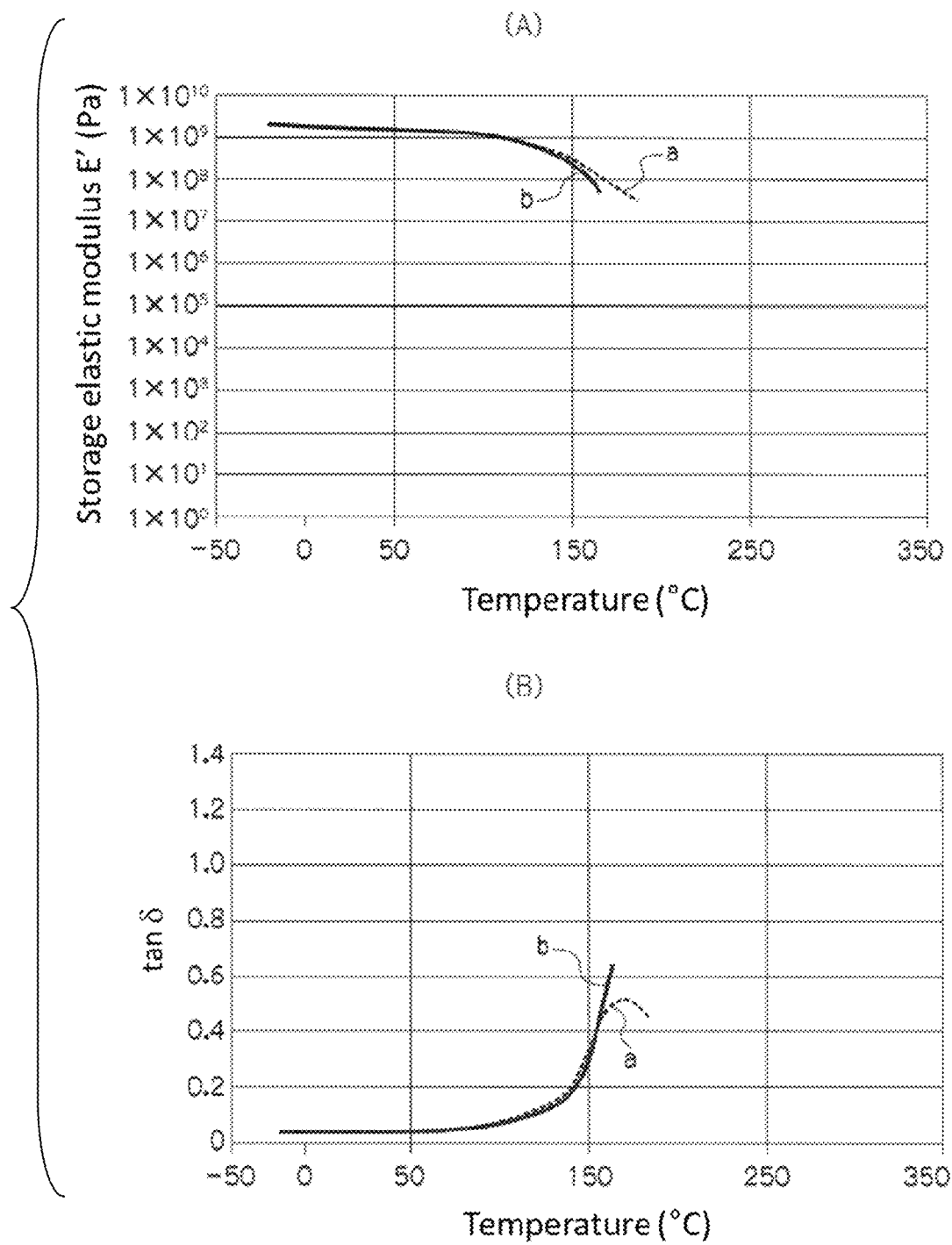
FIG. 5 shows a graph showing the storage elastic modulus (E') in the initial state or after storage at 80° C. for 200 hours (A), and a graph showing the temperature dependency of the loss tangent (tan δ) in the initial state or after storage at 80° C. for 200 hours (B), which graphs were obtained for the adhesive layer obtained in Example 1.
Figure 6:
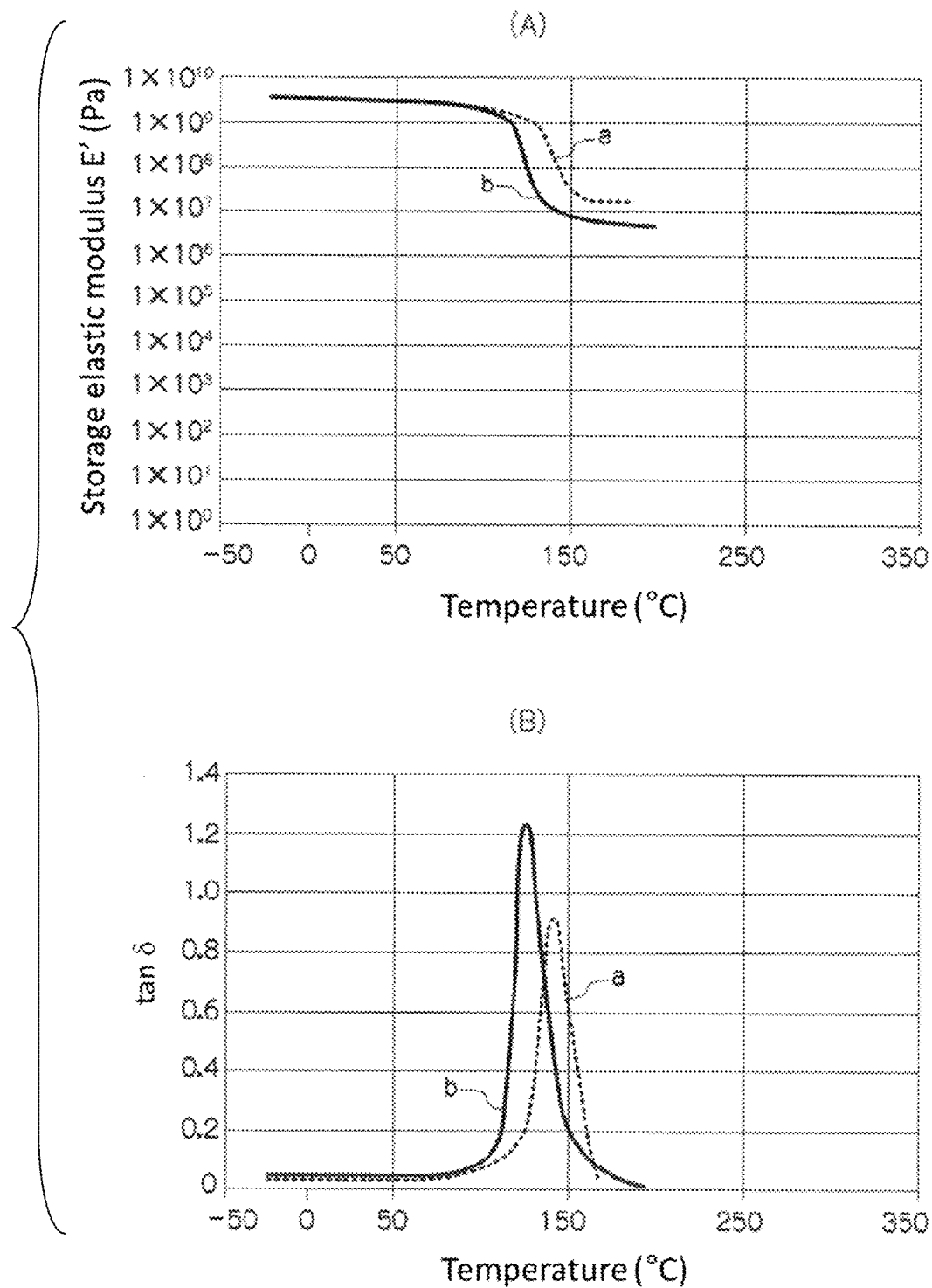
FIG. 6 shows a graph showing the storage elastic modulus (E') in the initial state or after storage at 80° C. for 200 hours (A), and a graph showing the temperature dependency of the loss tangent (tan δ) in the initial state or after storage at 80° C. for 200 hours (B), which graphs were obtained for the adhesive layer obtained in Comparative Example 1.

Subsequently, the adhesive layers obtained in Example 1 and Comparative Example 1 were subjected to measurement of the storage elastic modulus (E') and the loss tangent (tan δ) in the initial state or after storage at 80° C. for 200 hours. FIG. 5 shows a graph showing the storage elastic modulus (E') in the initial state or after storage at 80° C. for 200 hours (A), and a graph showing the temperature dependency of the loss tangent (tan δ) in the initial state or after storage at 80° C. for 200 hours (B), which graphs were obtained for the adhesive layer obtained in Example 1. FIG. 6 shows a graph showing the storage elastic modulus (E') in the initial state or after storage at 80° C. for 200 hours (A), and a graph showing the temperature dependency of the loss tangent (tan δ) in the initial state or after storage at 80° C. for 200 hours (B), which graphs were obtained for the adhesive layer obtained in Comparative Example 1.

Based on the results shown in FIG. 5 and FIG. 6, the results of measurement of E' and tan δ for Comparative Example 1 indicate a remarkable shift of the glass transition temperature of the adhesive layer toward the low-temperature side after the hot-water treatment, suggesting a decrease in the cohesive force due to water absorption or the like. In contrast, Example 1 showed no decrease in the glass transition temperature of the adhesive layer after the hot-water treatment. Thus, it is assumed that there was no decrease in the cohesive force due to water absorption or the like.

DESCRIPTION OF SYMBOLS

1. Adhesive layer
2A. First release film
2B. Second release film
10. Adhesive sheet

The invention claimed is:

1. An adhesive composition comprising: resin components that include:
   a bisphenol A epoxy resin;
   a tri- or higher-functional epoxy resin in addition to the bisphenol A epoxy resin;
   an acrylic particle having a core-shell structure containing a butadiene-based rubber, and epoxy-modified polymethacrylate or epoxy-modified polyacrylate; and
   a curing agent, wherein:
   the content of the bisphenol A epoxy resin and tri- or higher-functional epoxy resin ranges from 40 parts by mass to 90 parts by mass with respect to the total amount of the resin components in the adhesive composition;

the blending ratio of the acrylic particle is 3% to 33% by mass with respect to the total mass of the adhesive composition; and an adhesive layer formed from the adhesive composition has an adhesive strength retaining rate of not less than 68% after immersion in each of water at 80° C. 10% NaCl solution at 80° C., and 50% $CaCl_2$ solution at 80° C. for 200 hours following adhesion of a metal to a composite resin through the adhesive layer.

2. The adhesive composition according to claim 1, further comprising an acrylic resin that is a binary copolymer including a methyl methacrylate (MMA) block and butyl acrylate (BA) block optionally modified with a functional group that is a carboxylic acid, hydroxyl group, or amide group introduced to part of the BA block or MMA block.

3. The adhesive composition according to claim 1, wherein the acrylic particle has an average particle size of not more than 200 nm.

4. An adhesive sheet comprising an adhesive layer between a first release film and a second release film, the adhesive layer formed from the adhesive composition of claim 1.

5. The adhesive sheet according to claim 4, wherein the acrylic particle has an average particle size of not more than 200 nm.

6. The adhesive composition according to claim 1, further comprising an epoxy-modified silane compound.

7. The adhesive composition according to claim 6, wherein the epoxy-modified silane compound is:
γ-glycidoxypropyltrimethoxysilane;
γ-glycidoxypropyltriethoxysilane;
2-(3,4-epoxycyclohexyl)ethyltrimethoxysilane;
2-(3,4-epoxycyclohexyl)ethyltriethoxysilane;
(γ-glycidoxypropyl)(methyl)dimethoxysilane;
(γ-glycidoxypropyl)(ethyl)dimethoxysilane;
(γ-glycidoxypropyl)(methyl)diethoxysilane;
(γ-glycidoxypropyl)(ethyl)diethoxysilane;
[2-(3,4-epoxycyclohexyl)ethyl](methyl)dimethoxysilane;
[2-(3,4-epoxycyclohexyl)ethyl](ethyl)dimethoxysilane;
[2-(3,4-epoxycyclohexyl)ethyl](methyl)diethoxysilane;
[2-(3,4-epoxycyclohexyl)ethyl](ethyl)diethoxysilane;
(γ-glycidoxypropyl)(methoxy)dimethylsilane;
(γ-glycidoxypropyl)(methoxy)diethylsilane;
(γ-glycidoxypropyl)(ethoxy)dimethylsilane;
(γ-glycidoxypropyl)(ethoxy)diethylsilane;
[2-(3,4-epoxycyclohexyl)ethyl](methoxy)dimethylsilane;
[2-(3,4-epoxycyclohexyl)ethyl](methoxy)diethylsilane;
[2-(3,4-epoxycyclohexyl)ethyl](ethoxy)dimethylsilane;
[2-(3,4-epoxycyclohexyl)ethyl](ethoxy)diethylsilane;
a partial condensate thereof; or
any combination thereof.

8. The adhesive composition according to claim 2, wherein a ratio of the bisphenol A epoxy resin and tri- or higher-functional epoxy resin to the acrylic resin is 100:4 to 100:100 on a mass basis.

9. The adhesive composition according to claim 2, wherein the bisphenol A epoxy resin, tri- or higher-functional epoxy resin, and acrylic resin have a sea-island structure before curing in which particles of the acrylic resin are dispersed in the bisphenol A epoxy resin and tri- or higher-functional epoxy resin.

10. The adhesive composition according to claim 1, further comprising an epoxy-modified silicone resin having a polyorganosiloxane skeleton.

11. The adhesive composition according to claim 1, wherein the bisphenol A epoxy resin has a glass transition temperature ranging from 50° C. to 150° C.

12. The adhesive composition according to claim 1, wherein the bisphenol A epoxy resin has a backbone with 2 to 10 units.

13. The adhesive composition according to claim 1, wherein the tri- or higher-functional epoxy resin has a tris(hydroxyphenyl)methane structure, a tetrakis(hydroxyphenyl)ethane structure, an aminophenol structure, or a bis(aminophenyl)methane structure.

14. The adhesive composition according to claim 1, wherein the tri- or higher-functional epoxy resin has not less than three glycidyl ether groups.

15. The adhesive composition according to claim 1, wherein the content of the tri- or higher-functional epoxy resin is 5% to 50% by mass with respect to the total mass of the adhesive composition.

16. A method of adhering adherends, comprising: providing an adhesive sheet comprising an adhesive layer and a release film on a surface of the adhesive layer;
exposing the adhesive layer of the adhesive sheet by the release-film removal;
sandwiching the adhesive layer between a first adherend and a second adherend to provide initial adhesion between the first and second adherends; and
curing the adhesive layer by heat or under pressure and heat to strengthen adhesion between the first and second adherends, wherein:
the first and second adherends are each a metal or composite resin; and
the adhesive layer is formed from the adhesive composition according to claim 1.

17. A laminated body obtained by the method according to claim 16.

18. The adhesive composition according to claim 1, wherein the curing agent comprises a dicyandiamide-based curing agent in combination with a blocked isocyanate.

19. An adhesive composition comprising: resin components that include:
a bisphenol A epoxy resin;
a tri- or higher-functional epoxy resin in addition to the bisphenol A epoxy resin;
an acrylic particle having a core-shell structure containing a butadiene-based rubber, and polymethacrylate or polyacrylate; and
a curing agent, wherein:
the content of the bisphenol A epoxy resin and tri- or higher-functional epoxy resin ranges from 40 parts by mass to 90 parts by mass with respect to the total amount of the resin components in the adhesive composition; the blending ratio of the acrylic particle is 3% to 33% by mass with respect to the total mass of the adhesive composition;
the acrylic particle is the only particle present in the adhesive composition; and
an adhesive layer formed from the adhesive composition has an adhesive strength retaining rate of not less than 68% after immersion in each of water at 80° C., 10% NaCl solution at 80° C., and 50% $CaCl_2$ solution at 80° C. for 200 hours following adhesion of a metal to a composite resin through the adhesive layer.

* * * * *